United States Patent [19]
George

[11] 3,788,749
[45] Jan. 29, 1974

[54] IMAGE QUALITY RATING SYSTEM

[76] Inventor: Nicholas George, 4097 Robin Hill Rd., Pasadena, Calif. 91103

[22] Filed: Mar. 13, 1972

[21] Appl. No.: 234,191

[52] U.S. Cl...... 356/239, 350/160 LC, 350/162 SF, 356/71
[51] Int. Cl.......................... G01n 21/16, G06k 9/08
[58] Field of Search.......... 356/239, 71; 350/162 SF

[56] References Cited
UNITED STATES PATENTS

| | | | |
|---|---|---|---|
| 3,639,039 | 2/1972 | Rhodes, Jr. | 350/162 SF |
| 3,305,834 | 2/1967 | Cooper et al. | 350/162 SF |
| 3,615,433 | 10/1971 | Biernson et al. | 350/162 SF |
| 3,497,287 | 2/1970 | Lang | 350/162 SF |
| 3,178,997 | 4/1965 | Kelly | 350/162 SF |
| 3,689,772 | 9/1972 | George et al. | 356/71 |

OTHER PUBLICATIONS

"Linear Spatial Filtering with Crossed Ultrasonic Light Modulators", Stark et al., Proceedings of the IEEE, Vol. 57, No. 8, Aug. 69, pp. 1456 & 1457.
"Real Time . . . Image Conversion", Myers et al., IBM Tech. Disc. Bull., Vol. 11, No. 10, March 1969, pp. 1314–1316.
"Reversible . . . Liquid Crystals", Margerum et al., Applied Physics Letters, Vol. 17, No. 2, July 15, 1970, pp. 51–53.

*Primary Examiner*—John K. Corbin
*Assistant Examiner*—V. P. McGraw
*Attorney, Agent, or Firm*—Lindenberg, Freilich & Wasserman

[57] ABSTRACT

The sharpness of definition of an image on film may be automatically determined by comparing an original image on film with a perturbation of the same image formed from the original image. Such perturbation is achieved by using a hologram deblurring filter upon which the original image is projected. A photodetector is used to measure the power spectral density first of the original image, then of the deblurred image. As one criterion of the evaluation, the readings from the photodetector are compared and if the original image has a lower amount of high frequency content that the deblurred image then the original image is not a sharp image. If the original image has a substantially larger amount of high frequency content that the deblurred image then the original image is a sharp image.

8 Claims, 3 Drawing Figures

IMAGE QUALITY RATING SYSTEM

BACKGROUND OF THE INVENTION

This invention relates to a method and means for rating the sharpness or definition of an original image and more particularly to improvements therein.

In order to determine the definition of a photographic image, the most common technique is visual inspection by a photo-interpreter. A human observer can make subjective evaluations of image quality over a wide range of subject content, but the interpretations are slow and qualitative. One prior automatic method is to inspect for a sharp line in the scent; the "sharpness" of this edge is used to judge the definition of the entire scent. The "sharpness" can be evaluated by inspection of its diffraction pattern under collimated illumination or by direct microscopic observation. This method is limited in speed due to the need to "search" for the edge.

OBJECTS AND SUMMARY OF THE INVENTION

An object of this invention is to provide an image quality rating system.

Another object of this invention is to provide an image quality rating system which does not require human scanning in order to produce a correct answer.

Yet another object of the present invention is the provision of a new and useful image quality rating system.

These and other objects of the invention are achieved in an arrangement wherein, an original image, such as a transparency on film, is illuminated by monochromatic light, such as is received from a laser beam. The image is focused by a lens onto a photosensitive detector of the type which can measure the power spectral density of the image projected thereon by the lens. The output of the photodetector is stored. Thereafter, holographic or computer generated deblurring filters are interposed between the lens and the photosensitive detector and the blurred image is focused upon the photosensitive detector for measurement of the power spectral density thereof. A learning class of imagery, graded in quality, is prepared for storage in the computer for later comparison to the imagery which is to be evaluated, i.e., the voltages generated by the photosensitive detector for this learning class with each deblurring filter are stored. The voltages stored in response to the original image may be successively compared, using a computer, with the voltages for each one of the deblurred images. The computer performs a comparison of the voltage pattern derived from the voltages stored for the original image with the voltage pattern derived from the voltages stored for each one of the deblurred images, from which it can determine whether or not the original image has the sharpest quality and does not suffer from the faults of motion, defocus, etc. as determined by the filters. Should the pattern derived from the voltages generated in response to a blurred image be logically determined by the computer to be better than those from the image of the original object, then this is indicative of the problem which caused the original object not to be as sharp as it could have been.

DESCRIPTION OF THE PREFERRED EMBODIMENTS

Figures 1, 2:
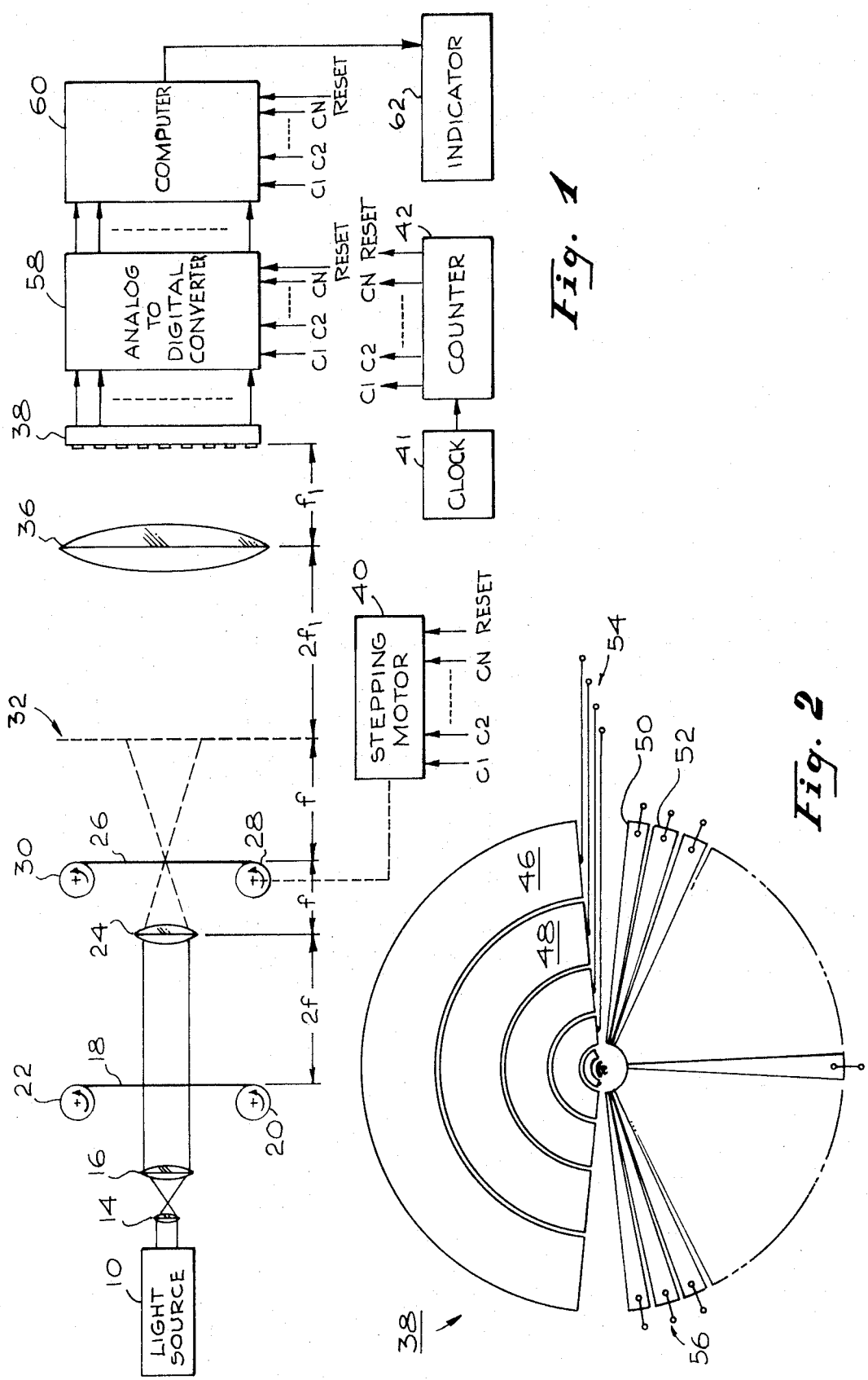
FIG. 1 is a schematic drawing of an embodiment of this invention.
FIG. 2 is a representation of a suitable photosensitive detector.

Referring now to FIG. 1, a collimated, band limited light source 10, such as a laser, through a suitable lens arrangement 14, 16, illuminates a frame of a film 18, which is drawn from a pay-off reel 20, to a take-up reel 22. When it is wished to study a frame to determine its sharpness, the film is maintained stationary.

The image of the stationary frame is focused by a lens 24, upon holographic deblurring filters 26, which are also in the form of successive frames on film. The film is unreeled from a payout reel 28 onto a take-up reel 30 under control of the stepping motor 32. Each deblurring filter may be an optimum for a specific idealized fault, e.g., image motion, defocus, turbulence, etc.

The use of deblurring filters for correcting an image is known and may be found described, for example, in an article entitled "Spatial-domain Laser Light Scanning Deconvolution of Blurred Photographs Using the General Holographic Deblurring Filter," by G. W. Stroke, M. Haliona, G. Inde Getouw, and F. Poisson, which is published in Optics Communications 1, No. 8, Page 355, March 1970. Also see an article by J. Tsujinchi, T. Honda, and T. Fuakaga, on Page 379 of the same issue of Optics Communication. It should be noted that the film 18, conveying the original images, should be spaced a distance on the order of twice the focal length of the lens 24, whereas the deblurring filters are positioned a distance equal to the focal length from the lens 24. The image plane of the lens 24 is at a location 32, which is at a distance which is twice the focal length from the lens 24. Another lens 36, is spaced a distance of twice its focal length (represented by $2f_1$ on the diagram), from the image plane. The photosensitive detector 38 is placed at a distance equal to the focal length $f_1$ from the lens 36.

Each successive deblurring filter is exposed for a time determined by a clock pulse source 40 which drives a counter 42. Each count of the counter indicated as C1 thru CN, drives a stepping motor 40, which advances the deblurring filter reel a frame at a time to insure successive deblurring filter exposure. The last count of the counter 42 is designated as the reset count and actuates the stepping motor 44 in a manner to return the deblurring filter reel to its initial position, which actually is the position in which there is no deblurring filter interposed in the light path from the scene being inspected.

The light distribution which is established at the locus 32 is characteristic of the object 18 as perturbed by the filter 26, i.e., it is the perturbed image; and with a screen placed at 32 subjective judgment of image quality can be made by comparing the images obtained with a series of deblur filters including a blank filter for seeing the unperturbed image.

The light distribution or diffraction pattern of the scene 18, which is established at the locus 38, is uniquely characteristic of the object and the information contained in the diffraction pattern, may be utilized to recognize or classify the object. The light energy in a diffraction pattern usually comprises a bright central spot on the optical axis, surrounded by regions of various brightnesses and spacings. There also may be bright lobes or spikes extending radially from the center, as well as an isolated spot. A typical diffraction pattern is characterized by symmetry and intensity about the center point. Any line through the center divides the pattern into two halfs, each of which contains all of the features defining the energy distribution and, hence, contains much information relating to the object to which the pattern is generated. As a result, the energy distribution may be determined by using two detector arrays, each of which samples one half of the pattern.

A photodetector which has two detector arrays and is suitable for use herein is shown in FIG. 2, where the upper half of the detector comprises spaced semi-circular concentric arcs of photodetector material 46, 48, by way of example, and the lower half consists of the spaced radially extending spokes of semi-conductor material 50, 52, by way of example. Each of the segments of the photodetector material has a wire extending through its entire length which is brought out to serve as an external connector, such as 54, 56 respectively. The semi-circular array of detectors is adapted to determine the radial distribution of energy and the radial detectors determine the angular distribution of energy. As indicated, each photo-conductive segment of the array is electrically isolated from every other photo-conductive segment and is provided with its own separate electrical lead. This photodetector measures power spectral density with the annuli and edges and correlation of edges and angles with the radial detectors. It is shown, described and claimed in an application entitled Light Pattern Detector, S.N. 172,629 filed 8/19/71 by Nicholas George, et al, now U.S. Pat. No. 3,689,772.

Referring back to FIG. 1, each one of the leads 54, 56, is connected to a separate analog to digital converter 58, to convert the voltage derived from a particular photo-conductive segment into a digital value or they may be combined as clues forming a smaller number of voltage outputs connected to separate analog to digital converter 58. These digital values are then entered into a computer 60, where they are stored.

The output of the counter 42 serves the function of clocking the operation of the analog to digital converter 58 as well as the computer 60. This operation consists of enabling the computer to separately store first the digital voltages representing the power spectral energy distribution detected without the use of the deblurring filter and thereafter to successively store the digital voltages representative of the power spectral energy distribution produced when the deblurring filters are successively interposed. It will be appreciated that for each image these voltages are derived from each annulus and wedge of the photodetector.

After the computer stores the nth spectral density distribution, the computer then compares the voltages representing the undistorted image spectral density distribution with the voltages representing each of the blurred image spectral density distributions to determine for example whether there are more high frequencies in the image viewed without a filter than in any of the blurred images. The sharpest image, or the one having the most high frequencies, usually is the one with the highest voltages at the outermost annuli of the detector 38 relative to the inner annuli and also the narrowest radial spikes of energy as ascertained by comparing the signal voltages on adjacent radial photodetectors, such as 50, 51, 52, with and without the filters. A computer can readily perform the function of comparing a large number of voltages, rapidly determining not only which of two sets of voltages is the larger, but also, which comparison produces the highest difference. The latter information is required to determine what caused the unsharp image. Thus, if the image seen without a deblurring filter produces a set of voltages which are relatively larger at outer annuli and narrower on radial wedges than those produced with the deblurring filter, then it is known that the image is sharp. However, if several of the deblurring filters improve the sharpness of the image, an analysis of the factor most responsible for the blurred image requires a knowledge of which one of the deblurring filters provided the largest degree of sharpness. The computer then actuates an indicator 62 to indicate its analysis of the image. The indicator may be a cathode ray tube display or a print out of the computer analysis.

Amplitude comparison is illustrative of one way of analyzing and using the data provided to a computer. Another way is to perform pattern classification analysis in a manner described in an article by Kasdan and Balakrishnan entitled "A Distribution-Free Pattern Classification Procedure with Performance Monitoring Capability", which was published by Academic Press as the Symposium record of 4th colloqium on Optimization of I.F.I.P., October, 19–22, 1971.

A method of automatically and quantitatively ranking the quality of imagery consistent with subjective methods is as follows:

First a data base is assembled that has been subjectively ranked according to quality. For instance, the imagery might be ranked on a scale of 0 to 100 in increments of 5. A number of samples of each class is selected to be used as the "learning data base." The remaining samples are used for testing decision rules which are developed from the learning data.

Each learning sample is inserted into the computer in the manner shown in FIG. 1. Each sample is coded according to its quality ranking (0, 5, 10 for instance). Additional data may also be included in the code such as scale, positive or negative film, aperture size, etc. - up to a total of 6 digits. The coding is all entered into the computer. The data for each sample is entered until all the learning data is recorded.

There also may be recorded a clear aperture and a uniform illumination set of measurements in order to compensate for variation in laser power, aperture size, or other changes in the system response.

One is then ready to study various clue formulations using the general purpose computer. For instance one may wish to study the correlation of a weighted sum of the ring measurements (or any other formulation) with quality. That is, one may wish to study the relationship between Q, the subjectively determined numeric quality measure, and Q' given by $$Q' = x_1 R_1 + x_2 R_2 \ldots + x_N R_N$$

where $R_1, R_2, \ldots R_N$ = the measured values of the energy in the N rings (usually normalized by $R_1$, the "DC" value), and $x_1, x_2 \ldots x$ = weighting coefficients that may be determined by multiple regression analysis of the recorded data.

Now, the remaining portion of the data base is sampled to provide a test of the coefficients. The values of $Q'$ are calculated for each test sample using the coefficients that have been determined and these results are compared with the subjectively determined values. Using just eight ring measurements, correlations exceeding 0.90 have been obtained using this approach.

Figure 3:
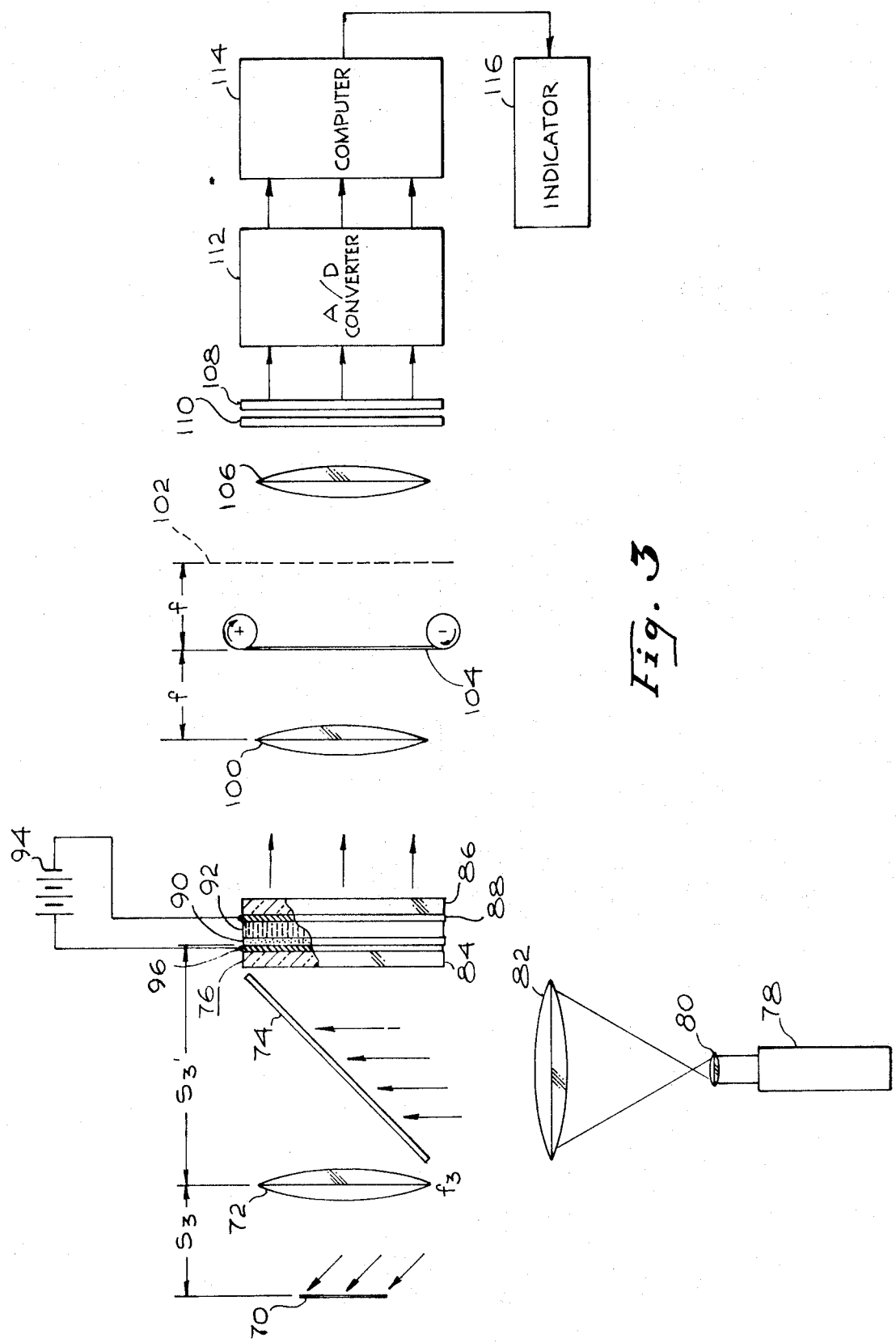
FIG. 3 is a schematic drawing of another embodiment of this invention.

The foregoing description of the embodiments of the invention describes an arrangement in which the source object is a transparency. When the image is in white light or, if the object is diffused or rough, the foregoing technique cannot be employed. However, if it is desired to evaluate the picture quality, one can make a transparency of the object which may be used in accordance with the previously described technique, or one can use an arrangement such as is shown in FIG. 3.

A naturally illuminated scene, or for example an object 70 such as paper money may be used. The illumination is by white or blue light. A lens 72 focuses the scene through a beam splitter 74 onto a "liquid crystal," 76. Also, focused on the liquid crystal is the light output of a laser 78. The laser light is imaged by two lenses respectfully 80, 82, so that it will cover the same image area on the liquid crystal as is covered by the scene being used. The beam splitter 74 reflects the laser light onto the liquid crystal 76. A liquid crystal of a suitable type, is described in an article entitled "Reversible Ultraviolet Imaging with Liquid Crystals" by Margerum, Nimoy and Wong, in the Applied Physics Letters for July 15, 1970, Vol. 17, No. 2.

The liquid crystal comprises two sandwiching glass plates which are respectively 84, 86. A transparent conductive coating respectively 86, 88, is coated on the inside surfaces of the two glass plates. A photo-conductive material 90, such as zinc sulphide, is coated over the conductive coating 86. Nematic liquid crystals 92, are maintained between the photo-conductor 90 and the conductive coating 88. An illustration of a nematic liquid crystal material is N - (p - methoxy bensylidene) - p-n-butylaniline.

The liquid crystal has the property that, when an electric field is established thereacross, as by a voltage source 94, which is connected to the respective conductive coatings 86 and 88, the liquid crystal will cause the laser light to scatter, as through a ground glass, but selectively where the white light of the image is intense on the photo-conductive laser, while the laser light passes undisturbed where the white light image is faint or dark. In other words, the liquid crystal will modulate whatever light is passed therethrough, whereby it will provide a reversed image in laser light of the image applied to its photo-conductive surface in white light. Thus, the image of the scene or object 70, which is illuminated with white light or blue-white light, is applied to the liquid crystal along with the laser beam light which has a wavelength $\lambda_o$. As a result the liquid crystal will emit a light image having both the light frequency of the object source 70 together with the laser light wavelength $\lambda_o$.

The lens 100, establishes a diffraction pattern of the light image applied thereto at the locus 104 and a perturbed image at 102 which is the distance 2f from the lens 100. The deblurring filters 104, are positioned at the distance f from the lens 100.

The lens 106 converts the perturbed-image into a perturbed diffraction pattern at 108 on a photo-sensitive detector 108, which is similar to the photo-sensitive detector 38, shown in FIG. 2. However, placed just in front of the photo-sensitive detector is a filter 110, which blocks out the white or blue-white light and passes the laser illumination $\lambda_o$. Thus the photo-detector 108 sees only the laser beam as modified by the liquid crystal image. This selectivity of the detector for the wavelength $\lambda_o$ can also be obtained by chosing a detector with poor response for wavelengths other than $\lambda_0$, thereby eliminating the need for the filter 110.

The photo-detector, as before, is connected to an analog-to-digital converter 112, whose output is connected to a computer 114. The output of the computer is supplied to an indicator 116. The system can be operated in the manner described for FIG. 1. It should be noted that the arrangement described in FIG. 3 may be used for converting objects illuminated by incoherent light into coherent light images and thus its utility is not confined to the system of image quality rating as described herein.

There has accordingly been described and shown herein a novel and useful arrangement for automatically determining image quality as well as the probable cause of image degradation which is present whether the image is illuminated with the coherent or incoherent light.

What is claimed is:
1. A system for automatically determining the quality of a light image comprising,
   a first lens means to which said light image is applied for establishing a diffraction pattern of said light image at the filter plane,
   photo-conductive detector means for establishing a pattern of voltages representative of the spectral energy distribution in the light diffraction pattern applied thereto,
   a second lens means for applying the diffraction pattern produced by said first lens means to said photoconductive detector means,
   a plurality of deblurring filters,
   means for successively placing each of said plurality of deblurring filters at the focal plane of said first lens means for deblurring the light image which has passed through said first said lens means,
   computer means including, means for successively storing the voltage patterns produced by said photoconductive detector means in response to the successive light diffraction patterns applied thereto without a deblurring filter and with the successive interposition of each of the plurality of the deblurring filters,
   means for comparing the pattern of voltages stored without a deblurring filter with each of the patterns of voltages stored when a deblurring filter is used for determining whether or not the quality of the light image is improved by any of the deblurring filters and which one, and
   means responsive to the determination of said means for comparing to produce an indication thereof.

2. A system as recited in claim 1 wherein said light image is derived by illuminating an object with coherent light.

3. A system as recited in claim 1 wherein an object is illuminated by incoherent light, to provide an incoherent light image, and there is included,
 a nematic liquid crystal means positioned between said object and said first lens means for receiving said incoherent light image,
 a source of coherent light,
 means for directing light from said source at said nematic liquid crystal means to provide an incoherent light image and a coherent light image corresponding to said incoherent light image, and
 a filter for blocking light from said incoherent light image and passing light from said coherent light image, said filter being positioned before said photodetector means.

4. A system as recited in claim 1 wherein means for comparing the pattern of voltage stored without a deblurring filter with each of the patterns of voltages stored when a deblurring filter is used for determining whether or not the quality of the light image is improved by any of the deblurring filters and which one includes means for comparing the amplitude of the set of voltages comprising the voltage pattern produced by the light image without a deblurring filter being used successively with the amplitudes of the sets of voltages comprising the respective voltage patterns produced by each of the light images produced by using each of the deblurring filters whereby the set of voltages having the largest amplitude and thereby the best quality image may be determined.

5. A method of automatically determining the quality of a coherent light image comprising the steps of
 generating a first pattern of voltages representative of the spectral energy distribution of said coherent light image,
 applying said coherent light image to a deblurring filter to produce a second coherent light image,
 generating a second pattern of voltages representative of the spectral energy distribution of said second coherent light image,
 comparing said first and second patterns of voltages to determine whether or not the quality of said coherent light image is improved by applying it to said deblurring filter.

6. A method for automatically determining the quality of a light image of an object comprising illuminating said object with incoherent light to establish an incoherent light image,
 converting said incoherent light image to a coherent light image,
 generating a first pattern of voltages representative of the spectral energy distribution of said coherent light image,
 applying said coherent light image to a deblurring filter to produce a second coherent light image,
 generating a second pattern of voltages representative of the spectral energy distribution of said second coherent light image,
 comparing said first and second pattern of voltages to determine whether or not the quality of said coherent light image is improved by applying it to said deblurring filter.

7. A system for converting the incoherent light image of an object into a coherent light image comprising,
 a nematic liquid crystal to which said incoherent light image is applied,
 a source of coherent light,
 means to apply light from said coherent light source to said nematic liquid crystal,
 filter means for passing coherent light and rejecting incoherent light, and
 means for applying light output from said nematic crystal to said filter means whereby the light output from said filter means comprises a coherent light image of said object.

8. A method of determining the quality of a coherent light image comprising the method of successively interposing different deblurring filters between said light image and a receiver whereby successive resultant images are received by said receiver, and evaluating said successive resultant light images received by said receiver to determine which one, if any, is enhanced by one of said deblurring filters.

* * * * *